(12) United States Patent
Rose et al.

(10) Patent No.: US 9,720,919 B1
(45) Date of Patent: *Aug. 1, 2017

(54) SYSTEM AND METHOD OF ASSESSING THE STATE OF A DATABASE PRODUCT FOR INSTALLATION CONSISTENCY

(71) Applicant: CA, Inc., New York, NY (US)

(72) Inventors: Robert C. Rose, Raleigh, NC (US); Richard L. Schertz, Raleigh, NC (US)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/561,487

(22) Filed: Dec. 5, 2014

Related U.S. Application Data (63) Continuation of application No. 13/665,739, filed on Oct. 31, 2012, now Pat. No. 8,938,424.

(51) Int. Cl.
*G06F 17/30* (2006.01)

(52) U.S. Cl.
CPC .... *G06F 17/3007* (2013.01); *G06F 17/30073* (2013.01); *G06F 17/30115* (2013.01)

(58) Field of Classification Search
CPC ........... G06F 17/3007; G06F 17/30073; G06F 3/0643; G06F 17/30115
USPC ....... 707/610, 611, 612, 613, 614, 617, 618, 707/638, 806; 709/201, 203, 213, 217
See application file for complete search history.

(56) References Cited

U.S. PATENT DOCUMENTS

| | | | |
|---|---|---|---|
| 5,481,722 A | 1/1996 | Skinner | |
| 5,491,820 A | 2/1996 | Belove et al. | |
| 5,787,153 A | 7/1998 | Bankay et al. | |
| 5,835,911 A | 11/1998 | Nakagawa et al. | |
| 5,845,077 A | 12/1998 | Fawcett | |
| 5,845,090 A | 12/1998 | Collins, III et al. | |
| 6,049,671 A | 4/2000 | Slivka et al. | |
| 6,073,214 A | 6/2000 | Fawcett | |
| 6,151,643 A | 11/2000 | Cheng et al. | |
| 6,199,204 B1 | 3/2001 | Donohue | |
| 6,202,207 B1 | 3/2001 | Donohue | |
| 6,256,668 B1 | 7/2001 | Slivka et al. | |
| 6,594,822 B1 * | 7/2003 | Schweitz | G06F 8/71 717/140 |
| 6,954,747 B1 * | 10/2005 | Wang | G06F 8/71 706/1 |
| 7,076,778 B2 * | 7/2006 | Brodersen | G06F 8/65 707/E17.032 |
| 7,546,594 B2 * | 6/2009 | McGuire | G06F 8/68 717/168 |
| 7,571,427 B2 * | 8/2009 | Wang | G06F 8/71 707/999.202 |

(Continued)

*Primary Examiner* — Frantz Coby
(74) *Attorney, Agent, or Firm* — Coats & Bennett, PLLC (57) ABSTRACT

A computer-implemented system and method performs an iterative process to assess the installation of an upgrade version of a database product for consistency with a baseline version of the database product. To assess the installation, the baseline version and the upgrade version are reconciled by modifying one or both of the baseline and upgrade versions. The modified baseline and upgrade versions are then analyzed to determine whether any remaining inconsistencies exist. Any remaining inconsistencies are then identified and classified, and reconciled. Thereafter, the process is repeated iteratively until the upgrade version is reconciled with the baseline version.

20 Claims, 4 Drawing Sheets

(56) References Cited

U.S. PATENT DOCUMENTS

| | | | | |
|---|---|---|---|---|
| 8,190,578 | B2* | 5/2012 | Bernstein | G06F 8/71 |
| | | | | 707/665 |
| 8,275,749 | B2* | 9/2012 | D'Souza | G06F 17/3056 |
| | | | | 707/634 |
| 8,442,950 | B2* | 5/2013 | D'Souza | G06F 17/30312 |
| | | | | 707/665 |
| 8,453,112 | B1 | 5/2013 | Brambley et al. | |
| 8,928,424 | B2* | 1/2015 | McCune, Jr. | H03K 7/06 |
| | | | | 327/105 |
| 9,038,029 | B2* | 5/2015 | Chaturvedi | G06F 11/368 |
| | | | | 715/736 |
| 9,098,563 | B2* | 8/2015 | Peer | G06F 17/30589 |
| 9,152,628 | B1* | 10/2015 | Stacey | G06F 17/30005 |
| 2003/0149581 | A1 | 8/2003 | Chaudhri et al. | |
| 2003/0233431 | A1* | 12/2003 | Reddy | G06F 9/466 |
| | | | | 709/221 |
| 2005/0165760 | A1* | 7/2005 | Seo | G06F 8/71 |
| 2007/0143373 | A1* | 6/2007 | D'Souza | G06F 17/303 |
| 2009/0144704 | A1* | 6/2009 | Niggemann | G06F 8/24 |
| | | | | 717/124 |
| 2012/0159434 | A1* | 6/2012 | Dang | G06F 8/751 |
| | | | | 717/120 |
| 2013/0293391 | A1 | 11/2013 | Osterloh et al. | |
| 2014/0075004 | A1* | 3/2014 | Van Dusen | H04L 41/04 |
| | | | | 709/223 |

* cited by examiner

SYSTEM AND METHOD OF ASSESSING THE STATE OF A DATABASE PRODUCT FOR INSTALLATION CONSISTENCY

RELATED APPLICATIONS

The present application is a continuation of U.S. patent application Ser. No. 13/665,739, which was filed on Oct. 31, 2012, and which is incorporated by reference herein in its entirety.

BACKGROUND

The present disclosure relates to computer database products, and more specifically, to systems and methods for assessing the state of a database product installation on a computing device.

Database products are commonly used applications. However, from time-to-time, such database products change and need to be upgrade. For example, a database associated with the database product may change with respect to the data structures and/or values in those structures. Additionally, the applications that allow a user to interface and interact with the database may change to modify existing functionality or add new functionality. Whatever the change, however, software developers typically verify an installation of an upgrade version of a database product as part of a quality assurance process prior to installation at a customer site. Such processes help to ensure that the upgrade version of the database product is stable and consistent with respect to the previous version of the database product.

There are many existing tools to help developers perform comparisons between different database versions. The comparison process primarily identifies the differences between a new, "clean" installation of the database and any supported upgrade of a previous version of the database to the new version. Such processes help to reduce database inconsistencies that can be the root cause of numerous problems. For example, product upgrades can have missing tables, missing keys, inconsistent keys, and inconsistent default parameters. Another area where data inconsistency can be problematic is when the database version (e.g., a third-party database used by an application) is upgrade as part of the main product upgrade. By way of example only, such changes include changes in the datatype (e.g., unlimited Binary Large Objects (BLOBs) changed to fixed 256 character strings), changes to the storage engine parameters, and changes to the default character set.

SUMMARY

According to one aspect of the present disclosure, a system and computer-implemented method is provided for assessing the state of a database product installation relative to a known baseline version of the database product. The baseline version of the database product may be, for example, a latest or newest version of the database product, while the upgrade version may be an older version of the database that is upgraded to the latest version. The method may be performed, for example, as part of a quality assurance process prior to the release of the database product to end users that will use it to upgrade their previous versions of the database product.

In one embodiment, the method assesses the installation of a database on a computing device by installing both a baseline version of a database product, and an upgrade version of the database product, on one or more computing devices. Once installed, the baseline version and the upgrade version are reconciled to account for known inconsistencies between the baseline version and the upgrade version. The reconciled versions may then be analyzed to determine whether any additional, unexpected inconsistencies exist between the baseline version and the upgrade version.

Of course, those skilled in the art will appreciate that the present embodiments not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, one aspect of the present disclosure provides a system and computer-implemented method for assessing the state of a database product installation relative to a known baseline version of the database product. The baseline version of the database product may be, for example, a latest or newest version of the database product, while the upgrade version may be an older version of the database product that is upgraded to the latest version. The method may be performed as part of a quality assurance process prior to the release of the newest version of the database product to end users.

More particularly, embodiments of the present disclosure first account for known or expected inconsistencies that may exist between the baseline version of the database product and the upgrade version of the database product, then analyze the two versions relative to each other to identify whether any additional inconsistencies between the two versions. These additional, unexpected inconsistencies, once identified, may be classified as acceptable differences, for example, or as a defect or deficiency and appropriately addressed in the upgrade version. The process of analyzing the versions to identify and address unexpected inconsistencies between versions of the database product occurs iteratively until all the unexpected inconsistencies between the versions are identified and addressed.

By performing the assessment as described herein, the operator is able to determine whether any changes or modifications were made to the baseline version of the database product that were not considered or accounted for in the upgrade version. For example, because of such changes or modifications, upgrade versions of a database product may be missing tables, have missing or inconsistent keys, incorrect schemas, missing data values, inconsistent default parameters, and the like. Additionally, third-party database vendors, when used, may add, modify, or eliminate a particular data type used by an application (e.g., changing a Binary Large Object (BLOB) to a fixed-length character string), or alter system tables and values. Because the assessment described herein identifies these issues and others like them, performing the assessment helps to ensure the stability and consistency of the database product when upgrading from previous versions. Further, the assessment may be performed during a quality assessment phase of development without having to formally configure the new version of the database product for a specific client.

Figure 1:
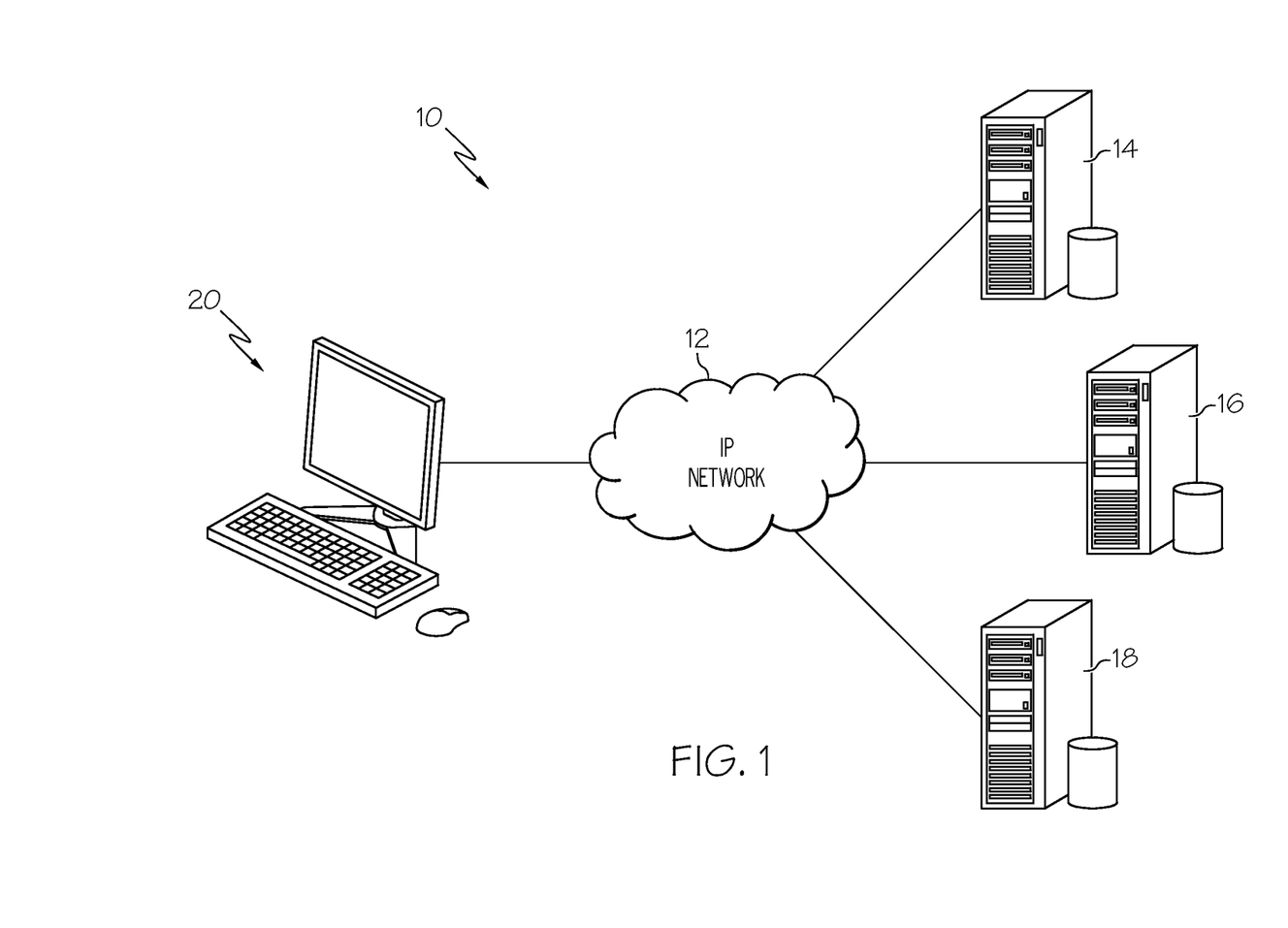
FIG. 1 is a block diagram illustrating a communications network configured according to one embodiment.

Referring now to the drawings, FIG. 1 is a block diagram illustrating a system 10 configured to assess and verify the state of a database installation according to one or more embodiments. The system 10 comprises a communications network 12 communicatively interconnecting a plurality of network servers 14, 16, 18 with a workstation 20 and any number of other client or network-based computing devices (not shown). Generally, network 12 comprises a communications network capable of communicating audio, video, signals, data, messages, and the like, between the network servers 14, 16, 18, workstation 20, and/or other computing devices. Exemplary networks include, but are not limited to, public or private data networks, Local Area Networks (LANs), Wide Area Networks (WANs), local, regional, or global computer networks, such as the Internet, for example, wireless and/or wireline networks, intranet networks, and any combination thereof.

Network 12 communicates information between the network servers 14, 16, 18 and workstation 20, for example, in packet data flows. Network 12 may utilize any protocol known in the art to communicate the data packets; but in one embodiment, network 12 employs a packet-based communication protocol such as the Internet Protocol (IP) to communicate the data packets. Network 12 may also operate according to one or more other communications protocols and technologies defined by any known standard as needed or desired. Some exemplary standards include, but are not limited to, those standards promulgated by one or more well-known bodies and organizations such as the Institute of Electrical and Electronics Engineers (IEEE) Inc., the International Telecommunications Union (ITU-T), the European Telecommunications Standards Institute (ETSI), the Internet Engineering Task Force (IETF), the Third Generation Partnership Project (3GPP), and the like.

The network servers 14, 16, 18 may comprise any suitable computing device operable to process data. Some examples of the network servers 14, 16, 18 include a host computer, a workstation, a web server, a file server, a personal computer such as a desktop or laptop computer, for example, or any other device operable to process data. Each of the network servers 14, 16, 18 may execute with any of the well-known operating systems such as MS-DOS, PC-DOS, OS-2, MAC-OS, MICROSOFT WINDOWS, UNIX, or other appropriate operating system.

Figure 2:
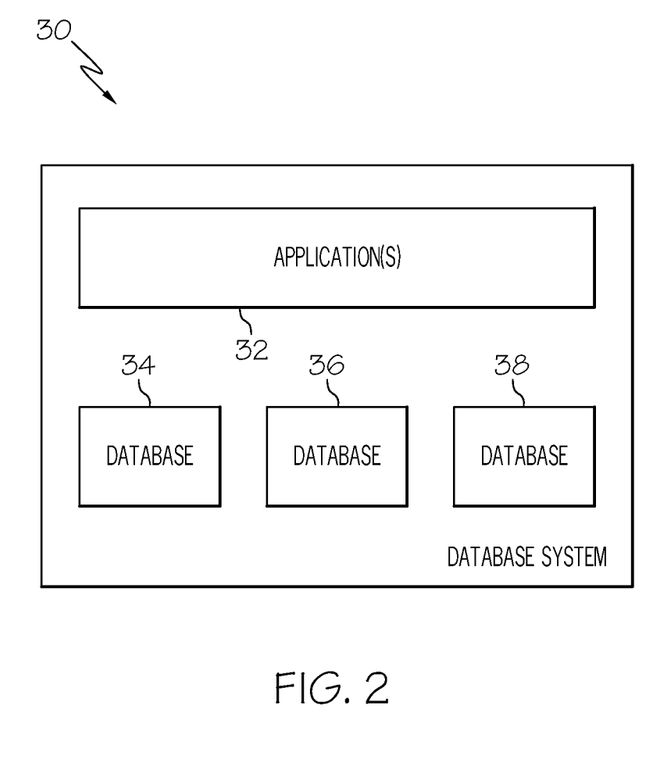
FIG. 2 is a block diagram illustrating a logical view of some exemplary components of a database product according to one embodiment.

The network servers 14, 16, 18 execute computer programs that allow other computers, such as workstation 20, to access and manipulate data stores. To that end, one or all of the network servers 14, 16, 18 may include a database product 30 (see FIG. 2). As seen in FIG. 2, the database product 30 may comprise one or more databases 34, 36, 38 that store and organize data in one or more tables or similar structures for a user. The database product 30 may also comprise one or more database application programs 32 that provide an interface to facilitate the user accessing that data. Additionally, the database product 30 may also include other files such as script files, for example, configured to perform specific functions such as creating data tables, sorting data, and installing applications.

A user associated with the workstation 20 or other computing device may store and retrieve data to and from a database associated with one or more of the network servers 14, 16, 18, as well as maintain and control the data within the database. To accomplish this, network servers 14, 16, 18, and workstation 20, are each equipped with one or more processors, memory, communication interfaces, and the like, as described later in more detail.

In one embodiment, one or all of the network servers 14, 16, 18, may have a database product 30 currently installed. From time-to-time, one or more of these currently installed database products 30 may need to be upgraded from a current version to a new version. The upgrade may be of the entire database product 30, or of portions of the database product 30. For example, such upgrades may occur periodically to distribute new application functionality and/or modify existing application functionality (e.g., bug fixes), or may occur to add/modify/delete the data and/or the structure of one or more of the tables in databases 34, 36, 38.

In accordance with one or more embodiments, the workstation 20 may execute logic and instructions that causes workstation 20 to assess the state of an upgrade database product 30 installation relative to a known baseline version of the database product 30. If the assessment reveals inconsistencies between the two versions that are unexpected, those inconsistencies are identified to a network operator, for example, so that they may be evaluated and appropriately addressed. Such quick identification of unexpected defects and/or deficiencies resulting from the upgrade process advantageously helps to ensure that the final product released to an end user is of a high quality, and that the installation process goes smoothly when performed at the end user's site.

Figure 3:
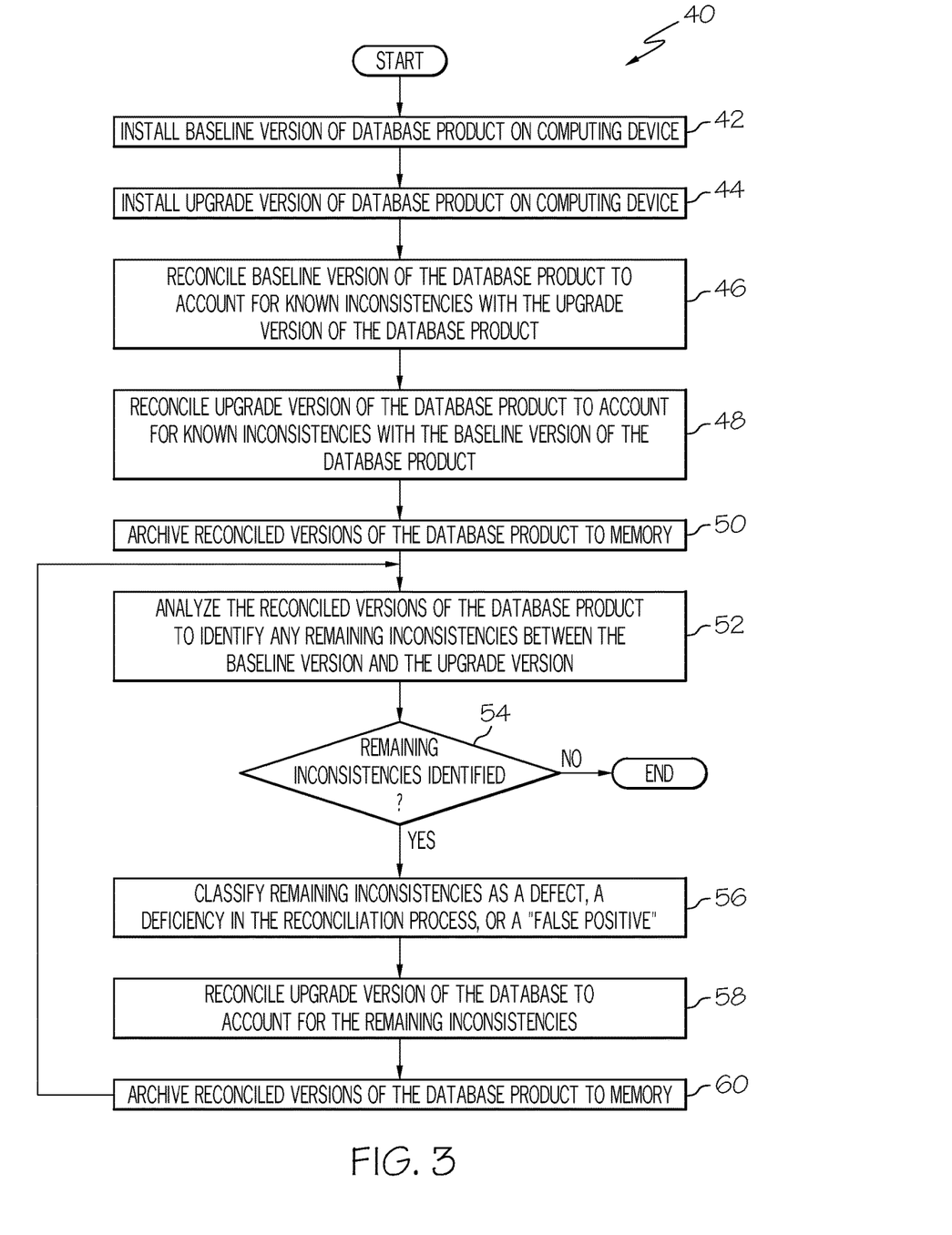
FIG. 3 is a flow diagram illustrating a method for assessing the state of a database product installation.

FIG. 3 is a flow diagram illustrating a method 40 performed by workstation 20 according to one embodiment. It should be noted that the specific mention of workstation 20, however, is merely for illustrative purposes. Those of ordinary skill in the art should readily understand that the method described in FIG. 3 and in the following text may also be performed on a network server 14, 16, 18, or on any computing device.

Method 40 begins with an operator at workstation 20, for example, installing a baseline version of database product 30 on one or more of the network servers 14, 16, 18 (box 42). The baseline version represents a latest version of the database product 30. The operator also installs an upgrade version of the database product 30 on one or more of the network servers 14, 16, 18 (box 44). For example, the operator may first install an older, previous version of the database product 30, or a current version of the database product 30, onto one or more of the network servers 14, 16, 18, and then perform an upgrade process to upgrade that prior or current version to the latest version. Alternatively, in cases where an older version of database product 30 is currently installed, the operator may simply perform the upgrade process to upgrade the previous version of the database product 30 to the new version of database product 30. However, regardless of how the installation processes occur, it should be noted that one or both of the baseline version and the upgrade version may reside entirely on one of the network servers 14, 16, 18, or be distributed across multiple network servers 14, 16, 18.

Once the baseline and upgrade versions are installed, the operator reconciles the baseline version of the database product 30 to account for the known inconsistencies with the upgrade version (box 46). The operator also reconciles the upgrade version of the database product 30 to account for the known inconsistencies with the baseline version (box 48).

Particularly, there are differences or inconsistencies that usually exist between versions of a database product 30. In many cases, the differences or inconsistencies may be published by the developers of the database product 30. Such publication allows the operators of the network to generally be aware of certain specified differences or inconsistencies between the baseline version and the upgrade version of the database product 30. However, operators may not be aware of other inconsistencies. Such consistencies may include, for example, changes in data structures, data values, data types, script files, and application logic. The process of "reconciling" the database product 30 in accordance with one or more embodiments, therefore, is defined as eliminating or marking these known or expected inconsistencies so that later, when the system assesses the upgrade version of the database product installation relative to the baseline version, the system will only locate and identify any remaining, unexpected inconsistencies to the operator.

There are many ways in which one or both of the database versions can be reconciled. For example, data values that are certain to be different or inconsistent between versions may be eliminated. In one embodiment, for example, variable timestamps in one or both the baseline and upgrade versions of the database 30 may be eliminated as these values may indicate a date and a time at which a specific event already occurred (e.g., LastUpdated, InsertedOn, LastUsed, UpdatedOn, etc.). Because these values are associated with past events, their values are certain to be different from any such values in the newer baseline version. Alternatively, such timestamps and/or other fields may be temporarily set to the same predetermined default values rather than simply temporarily eliminating the variable.

Additionally, reconciling the data tables in both versions may require sorting the tables according to a primary key. Where no primary key exists, the tables may be sorted by a unique combination of the fields in the corresponding tables. Further, in one embodiment, default values for the columns in corresponding tables are verified to ensure that they are the same value. If such values are different, the system may be configured to force one of the values to reflect the other. Additionally, table schemas are altered to be the same, as well as the tables. If a table exists in one version that does not exist in another, the existing table may be eliminated temporarily.

In addition to the data, the database product 30 may include one or more applications and/or script files that are installed with the system. Provided such differences or inconsistencies are known to exist between the script files (or other logic files) in the two versions, these, too, may be reconciled to ensure that the subsequent analysis does not indicate the known or expected inconsistencies as unexpected inconsistencies. For example, the files may be temporarily eliminated or altered to reflect the corresponding files. Further, the reconciliation process may account for data and logic differences related to versioning. Where just the database 34, 36, 38 is upgrade, the system tables are also reconciled to ensure that the upgrade version of the database product 30 matches that of the baseline version of the database product 30. Of course, the reconciliation actions previously described are not exclusive. Other actions may be taken as needed or desired to one or both of the versions to reconcile the inconsistencies between them.

Once the baseline version and the upgrade version are reconciled, the system may archive the reconciled versions of the database product 30 (box 50). The system then analyzes the baseline and upgrade versions of the database product 30 relative to each other to identify any unexpected inconsistencies between the two versions (box 52). By way of example, the system may compare the two reconciled versions to determine whether any unexpected differences or inconsistencies exist. If none exist (box 54), the procedure ends. However, if the system identifies one or more unexpected differences or inconsistencies (box 54), the system classifies them as being either a defect, a result of a deficiency in the reconciliation process, or in some cases, a known "false positive" that cannot be reconciled (box 56).

A defect is a difference or inconsistency that should have been accounted for in the design and building of the database product, but was not. In these cases, a developer may need to alter code and/or data associated with the database product to correct the defect; however, because the defect is identified, the developer can perform such a fix relatively easily. A deficiency in the reconciliation process is therefore a difference or inconsistency that the operator or other personnel performing the method should have reconciled, but for one reason or another, did not account for the difference. The operator may cure such deficiencies during the next iteration of the process.

A "false positive" is a known or unknown difference between versions that in some circumstances, may not be altered or modified by the operator during the reconciliation process, and as such, will remain different. For example, consider a user application that utilizes a third-party database. In addition to the tables that are used by a user application, the third-party database may contain tables and data specific to the administration of third-party database. By way of example, such tables may include system data specific to the administration of the database that has been changed from previous versions. A "false positive" would indicate that such system data has changed, even though the changed data is independent of the user application and data being analyzed. In another example, a false positive may indicate a change in a schema of the system tables between versions of the third-party database, such as when the columns of corresponding tables appear in a different order or if the script files that create the tables add the columns in a different sequence, or if the third-party database has inconsistencies that may not be accounted for as part of the reconciliation process. In such cases, the "false positive" would be noted, and then simply accepted as a difference.

Once the differences have been evaluated and classified, the system modifies and reconciles the upgrade version as previously described to account for the newly-identified differences (box 58) and archives the newly-reconciled version of the upgrade database product 30 (box 60). The system then repeats the analysis of the reconciled versions to determine whether any additional, unexpected differences or inconsistencies exist. This process (boxes 52, 54, 56, 58, 60) iteratively continues until all differences or inconsistencies between the baseline version of the database 30 and the upgrade version of the database 30 are accounted for and addressed.

Figure 4:
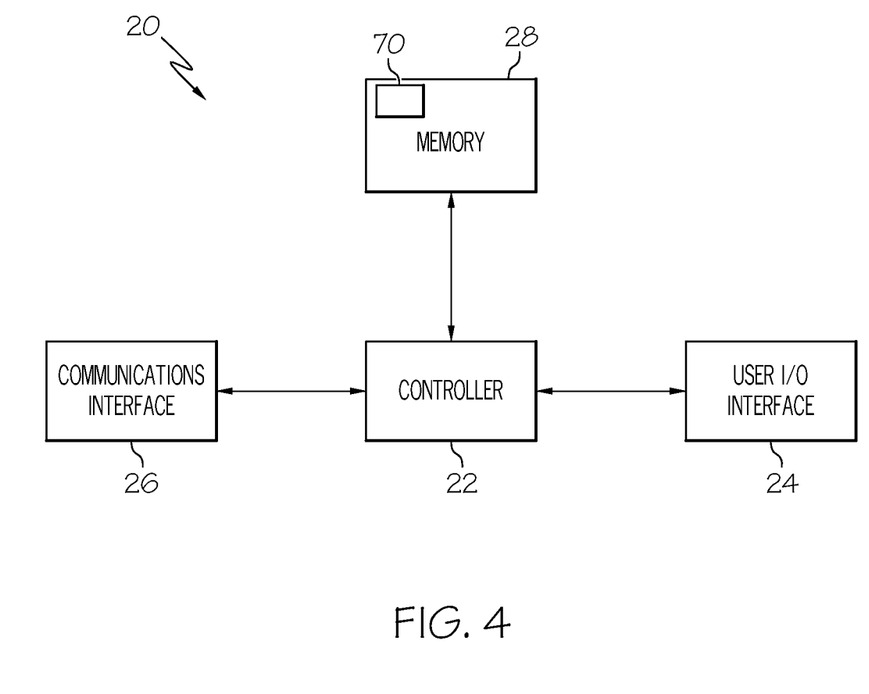
FIG. 4 is a block diagram illustrating some component parts of a computing device configured to assess the state of a database product installation according to one or more embodiments.

FIG. 4 is a functional block diagram illustrating some components of an exemplary workstation 20 configured to operate according to one or more embodiments. Although FIG. 4 and the following description are in terms of workstation 20, those of ordinary skill in the art will appreciate that the network servers 14, 16, 18 have similar components.

As seen in FIG. 4, workstation 20 comprises a programmable controller 22, a user I/O interface 24, a communications interface 26, and a memory 28. Workstation 20 executes with any of the well-known operating systems such as MS-DOS, PC-DOS, OS-2, MAC-OS, MICROSOFT WINDOWS, UNIX, or other appropriate operating system.

The user I/O interface 24 provides the components necessary for a user to interact with the workstation 20. Such components include, but are not limited to, a display and a keyboard that allows an operator to install the baseline and upgrade versions of the database 30, as well as reconcile both versions and view the expected and unexpected inconsistencies. Based on the inconsistencies or differences viewed by the operator, for example, the operator may make decisions on how to reconcile one or both of the baseline and upgrade versions of database product 30.

The communications interface 26 comprises a transceiver or other communications interface that facilitates the communications with the network servers 14, 16, 18 via IP network 12. The memory 24 may comprise any non-transitory, solid state memory or computer readable media known in the art. Suitable examples of such media include, but are not limited to, ROM, DRAM, Flash, or a device capable of reading computer-readable media, such as optical or magnetic media. The memory 28 stores programs and instructions 62 that cause the programmable controller 22 to reconcile the baseline and upgrade versions of the database product 30, analyze the reconciled versions of the database product to account for expected differences, and determine whether unexpected differences exist between the baseline version and the upgrade version based on the analysis.

The programmable controller 22 may be implemented by one or more microprocessors, hardware, firmware, or a combination thereof, and generally controls the operation and functions of the workstation 20 according to the appropriate standards. Such operations and functions include, but are not limited to, communicating with the network servers 14, 16, 18 as previously described. In this regard, the programmable controller 22 may be configured to the implement logic and instructions 60 stored in memory 28 to perform the method according to the embodiments as previously described.

The present embodiments may, of course, be carried out in other ways than those specifically set forth herein without departing from essential characteristics of the disclosure. For example, the embodiments describe the assessment in terms of a single upgrade version of database 30 assessed relative to a baseline version of database 30. However, this is for illustrative purposes only. The present embodiments may also be utilized to determine the unexpected differences between any number of upgrade versions of database product 30 to the baseline version of database product 30. Further, where multiple upgrade versions are considered, it should be understood that any or all of the upgrade versions need not be upgrade from the same previous version. Rather, one or more of the previous versions may be any prior version of database 30.

Additionally, those of ordinary skill in the art will readily appreciate that the baseline and the upgrade versions of database 30 may or may not be installed on the same computing device. Additionally, one or both of the versions may be installed on a single device, or portions distributed across multiple devices. Thus, one or more of the databases 34, 36, 38 may be resident on one server, for example, while the corresponding applications 32 are resident on another server.

It should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer-implemented method comprising:
reconciling known inconsistencies between a baseline version of a database product that is installed on a first computing device and an upgrade version of the database product that is installed on the first or a second computing device, wherein reconciling the known inconsistencies comprises modifying one or both of the baseline version and the upgrade version; and
determining whether the upgrade version differs from the baseline version after the reconciling, wherein the determining comprises:
comparing the baseline version to the upgrade version;
identifying remaining inconsistencies between the baseline version and the upgrade version based on the comparison; and
classifying each remaining inconsistency as being a corresponding one of a plurality of pre-determined inconsistency types.

2. The computer-implemented method of claim 1 wherein modifying one or both of the baseline version and the upgrade version comprises modifying at least one of a data value, a data structure, and application code associated with one or both of the baseline version and the upgrade version.

3. The computer-implemented method of claim 2 wherein modifying one or both of the baseline version and the upgrade version comprises sorting a database table associated with one of the baseline version and the upgrade version to match a sorting of a corresponding table associated with the other of the baseline version and the upgrade version based on the known inconsistencies.

4. The computer-implemented method of claim 1 wherein reconciling the known inconsistencies further comprises eliminating an artifact associated with one or both of the baseline version and the upgrade version based on the known inconsistencies.

5. The computer-implemented method of claim 1 wherein reconciling the known inconsistencies further comprises marking a known inconsistency in at least one of the baseline version and the upgrade version.

6. The computer-implemented method of claim 1 further comprising analyzing the remaining inconsistencies between the baseline version and the upgrade version, and wherein classifying each remaining inconsistency as being a corresponding one of a plurality of pre-determined inconsistency types comprises classifying each remaining inconsistency based on the analysis.

7. The computer-implemented method of claim 6 wherein classifying each remaining inconsistency based on the analysis comprises classifying a given remaining inconsistency as being one of:

a defect in one or both of the baseline version and the upgrade version;
a deficiency in one or both of the baseline version and the upgrade version that occurred while the baseline and upgrade versions were being reconciled; and
an inconsistency between the baseline version and the upgrade version that cannot be reconciled.

8. A computing device comprising:
a user input/output interface;
a communications interface configured to communicate with a remote device via a communications network; and
a programmable controller circuit configured to:
reconcile known inconsistencies between a baseline version of a database product that is installed on a first computing device and an upgrade version of the database product that is installed on the first or a second computing device, wherein to reconcile the known inconsistencies the programmable controller modifies one or both of the baseline version and the upgrade version; and
determine whether the upgrade version differs from the baseline version after reconciling, wherein to determine whether the upgrade version differs from the baseline version, the programmable controller circuit is further configured to:
compare the baseline version to the upgrade version after reconciling;
identify remaining inconsistencies between the baseline version and the upgrade version based on the comparison; and
classify each remaining inconsistency as being a corresponding one of a plurality of pre-determined inconsistency types.

9. The computing device of claim 8 wherein to modify one or both of the baseline version and the upgrade version, the programmable controller circuit is further configured to modify at least one of a data value, a data structure, and application code associated with one or both of the baseline version and the upgrade version.

10. The computing device of claim 9 wherein to modify one or both of the baseline version and the upgrade version, the programmable controller circuit is further configured to sort a database table associated with one of the baseline version and the upgrade version to match a sorting of a corresponding table associated with the other of the baseline version and the upgrade version based on the known inconsistencies.

11. The computing device of claim 8 wherein to reconcile the known inconsistencies, the programmable controller circuit is further configured to eliminate an artifact associated with one or both of the baseline version and the upgrade version based on the known inconsistencies.

12. The computing device of claim 8 wherein to reconcile the known inconsistencies, the programmable controller circuit is further configured to mark a known inconsistency in at least one of the baseline version and the upgrade version.

13. The computing device of claim 8 wherein the programmable controller circuit is further configured to analyze the remaining inconsistencies between the baseline version and the upgrade version, and wherein to classify each remaining inconsistency as being a corresponding one of a plurality of pre-determined inconsistency types, the programmable controller circuit is configured to classify the remaining inconsistencies based on the analysis.

14. The computing device of claim 13 wherein to classify each remaining inconsistency based on the analysis, the programmable controller circuit is further configured to classify a remaining inconsistency as one of:
a defect in one or both of the baseline version and the upgrade version;
a deficiency in one or both of the baseline version and the upgrade version that occurred while the baseline and upgrade versions were being reconciled; and
an inconsistency between the baseline version and the upgrade version that cannot be reconciled.

15. A computer readable storage medium storing computer program code thereon, wherein the computer program code, when executed by a processing circuit of a computing device, configures the processing circuit to:
reconcile known inconsistencies between a baseline version of a database product that is installed on a first computing device and an upgrade version of the database product that is installed on the first or a second computing device, wherein to reconcile the known inconsistencies the computer program code configures the processing circuit to modify one or both of the baseline version and the upgrade version; and
determine whether the upgrade version differs from the baseline version after reconciling, wherein to determine whether the upgrade version differs from the baseline version, the computer program code further configures the processing circuit to:
compare the baseline version to the upgrade version after reconciling;
identify remaining inconsistencies between the baseline version and the upgrade version based on the comparison; and
classify each remaining inconsistency as being a corresponding one of a plurality of pre-determined inconsistency types.

16. The computer readable storage medium of claim 15 wherein the computer program code further configures the processing circuit to modify at least one of a data value, a data structure, and application code associated with one or both of the baseline version and the upgrade version.

17. The computer readable storage medium of claim 16 wherein the computer program code further configures the processing circuit to sort a database table associated with one of the baseline version and the upgrade version to match a sorting of a corresponding table associated with the other of the baseline version and the upgrade version based on the known inconsistencies.

18. The computer readable storage medium of claim 15 wherein the computer program code further configures the processing circuit to eliminate an artifact associated with one or both of the baseline version and the upgrade version based on the known inconsistencies.

19. The computer readable storage medium of claim 15 wherein the computer program code further configures the processing circuit to mark a known inconsistency in at least one of the baseline version and the upgrade version.

20. The computer readable storage medium of claim 15 wherein the computer program code further configures the processing circuit to:
analyze the remaining inconsistencies between the baseline version and the upgrade version; and
based on the analysis, classify a remaining inconsistency as one of:
a defect in one or both of the baseline version and the upgrade version;

a deficiency in one or both of the baseline version and the upgrade version that occurred while the baseline and upgrade versions were being reconciled; and an inconsistency between the baseline version and the upgrade version that cannot be reconciled.

\* \* \* \* \*